(12) United States Patent
Brittain et al.

(10) Patent No.: US 8,429,137 B2
(45) Date of Patent: Apr. 23, 2013

(54) ENTERPRISE DATA DUPLICATION IDENTIFICATION

(75) Inventors: Brian Brittain, Collierville, TN (US); Mark Cooper, Cordova, TN (US); Viswanath Yerramsetty, Oviedo, FL (US)

(73) Assignee: Federal Express Corporation, Memphis, TN (US)

( * ) Notice: Subject to any disclaimer, the term of this patent is extended or adjusted under 35 U.S.C. 154(b) by 226 days.

(21) Appl. No.: 12/874,391

(22) Filed: Sep. 2, 2010

(65) Prior Publication Data
US 2012/0059827 A1    Mar. 8, 2012

(51) Int. Cl.
*G06F 17/30*    (2006.01)

(52) U.S. Cl.
USPC .......................................... 707/692; 707/741

(58) Field of Classification Search ........... 707/741, 707/754, 758, 950, 692, 697, 698, 699, 613, 707/792, 705, 776
See application file for complete search history.

(56) References Cited

U.S. PATENT DOCUMENTS

| | | | |
|---|---|---|---|
| 6,745,194 B2 * | 6/2004 | Burrows ........................... | 1/1 |
| 6,804,667 B1 | 10/2004 | Martin | |
| 8,131,924 B1 * | 3/2012 | Frandzel et al. ............ | 711/113 |
| 8,285,690 B2 * | 10/2012 | Nakamura et al. ............ | 707/692 |
| 2003/0126156 A1 * | 7/2003 | Stoltenberg et al. ....... | 707/104.1 |
| 2006/0242210 A1 * | 10/2006 | Ring et al. .................... | 707/204 |
| 2008/0319983 A1 * | 12/2008 | Meadows ........................ | 707/5 |
| 2010/0005048 A1 * | 1/2010 | Bodapati et al. ................ | 706/47 |
| 2010/0169348 A1 | 7/2010 | Maro et al. | |
| 2010/0266168 A1 * | 10/2010 | Wang et al. .................... | 382/124 |
| 2010/0268742 A1 * | 10/2010 | Ring et al. ..................... | 707/792 |
| 2011/0191305 A1 * | 8/2011 | Nakamura et al. ............ | 707/692 |
| 2012/0101989 A1 * | 4/2012 | Ring et al. ..................... | 707/613 |

OTHER PUBLICATIONS

International Search Report and Written Opinion dated Nov. 10, 2011, for Application No. PCT/US2011/049909 (11 pages).
Elmagarmid et al., "Duplicate Record Detection: A Survey," IEEE Transactions on Knowledge and Data Engineering, vol. 19, No. 1, Jan. 2007 (pp. 1-16).

\* cited by examiner

*Primary Examiner* — Jean M Corrielus
(74) *Attorney, Agent, or Firm* — Finnegan, Henderson, Farabow, Garrett & Dunner, LLP (57) ABSTRACT

Systems, methods, and computer program products are provided for identifying duplicate data. In one exemplary embodiment, there is provided a method for identifying duplicate data. The method may include identifying one or more reference fields that include one or more data values. The method may include retrieving the one or more reference fields and one or more data values. The method may also include transforming the one or more reference fields into one or more reference fingerprint patterns. The method may also include identifying one or more target fields that include one or more target field values. The method may also include retrieving the one or more target fields. The method may also include transforming the one or more target field values into one or more target fingerprint patterns. The method may also include comparing the one or more reference fingerprint patterns with the one or more target fingerprint patterns. The method may further include determining an overlap between the one or more reference fingerprint patterns and the one or more target fingerprint patterns.

15 Claims, 6 Drawing Sheets

500

| Data Values | | Fingerprint Pattern |
|---|---|---|
| ASIA1012 | → | AAAA9999 |
| CAFE2161 | → | AAAA9999 |
| CANW0316 | → | AAAA9999 |
| FDXW0212 | → | AAAA9999 |
| FDXW03 | → | AAAA99 |
| FDXW0414 | → | AAAA9999 |
| FWST0605 | → | AAAA9999 |
| GRASP | → | AAAAA |
| GSMW0101 | → | AAAA9999 |

| Reference Field | Systems | Databases | Tables |
|---|---|---|---|
| ADDRESS | 129 | 352 | 5,410 |
| CONTACT INFORMATION | 89 | 186 | 5,045 |
| CONTACT NAME | 157 | 482 | 5,788 |
| CUSTOMER NUMBER | 115 | 356 | 7,235 |
| EMPLOYEE | 157 | 377 | 6,148 |
| INVOICE | 22 | 49 | 105 |
| LOCATION NAME | 28 | 113 | 146 |
| METER NUMBER | 43 | 92 | 274 |
| SOFTWARE VERSION | 3 | 3 | 3 |
| TRACKING | 101 | 196 | 3,375 |
| _Express Freight_ | 5 | 7 | 32 |
| _Ground_ | 12 | 18 | 47 |
| _Express International_ | 50 | 104 | 321 |
| _Freight_ | 3 | 3 | 18 |
| _Express Domestic_ | 70 | 123 | 3,015 |
| UUID NUMBER | 19 | 29 | 127 |
| VENDOR NAME | 5 | 7 | 11 |

| Field | Count |
|---|---|
| account_nbr | 4 |
| acct_nbr | 6 |
| aggr_cust_nbr | 2 |
| alt_cust_id_num | 1 |
| bill_to_cust_nbr | 2 |
| cf_cust_nbr | 5 |
| cf_decsn_mkr_acct_nbr | 4 |
| cf_exp_cust_acct_nbr | 1 |
| cf_exp_shpr_cust_acct_nbr | 1 |
| cf_payr_cust_nbr | 1 |
| cf_recp_cust_nbr | 4 |
| cf_sgl_shpr_acct_nbr | 1 |
| cf_shp_cust_nbr | 1 |
| cr_cust_nbr | 140 |
| cust_acct_nbr | 1 |
| cust_id | 180 |
| cust_nbr | 1 |
| cust_nbr_9org | |

| Field | Count |
|---|---|
| decsn_mkr_acct_nbr | 4 |
| edi_bil_to_nbr | 2 |
| edi_cust_nbr | 4 |
| exp_acct_nbr | 8 |
| exp_cmplnt_cust_acct_nbr | 1 |
| exp_cust_acct_nbr | 1 |
| exp_drop_shpr_nbr | 1 |
| exp_shpr_cust_nbr | 1 |
| express_account_nbr | 3 |
| exprs_acct_nbr | 1 |
| exprs_cust_acct_nbr | 1 |
| fgt_payr_cheeracct | 1 |
| fxs_acct_nbr | 9 |
| gnd_payr_acct_nbr | 2 |
| loc_fxexp_acct_nbr | 1 |
| local_acct_ref_nbr | 3 |
| parent_cust_nbr | 2 |
| pamt_payr_cust_nbr | |

| Field | Count |
|---|---|
| payer_cust_acct_nbr | 1 |
| payor_cust_acct_nbr | 1 |
| payor_cust_nbr | 7 |
| payr_cust_nbr | 211 |
| pri_acct_nbr | 2 |
| prim_acct_nbr | 2 |
| reb_acct_nbr | 1 |
| recp_acct_nbr | 6 |
| recp_cust_nbr | 23 |
| sgl_shpr_acct_nbr | 4 |
| ship_cust_acct_nbr | 1 |
| shp_acct_nbr | 31 |
| shp_cust_nbr | 45 |
| shpr_acct_nbr | 6 |
| shpr_cust_nbr | 54 |
| ss_acct_nbr | 1 |

| Data Values | | Fingerprint Pattern |
|---|---|---|
| ASIA1012 | → | AAAA9999 |
| CAFE2161 | → | AAAA9999 |
| CANW0316 | → | AAAA9999 |
| FDXW0212 | → | AAAA9999 |
| FDXW03 | → | AAAA99 |
| FDXW0414 | → | AAAA9999 |
| FWST0605 | → | AAAA9999 |
| GRASP | → | AAAAA |
| GSMW0101 | → | AAAA9999 |

ENTERPRISE DATA DUPLICATION IDENTIFICATION

TECHNICAL FIELD

The present invention generally relates to systems and methods for identifying duplicate data. More particularly, the present invention relates to systems and methods for identifying duplicate data in different systems, databases, and tables.

BACKGROUND

Companies often store data in numerous tables, databases, and systems. Since companies often add, update, and delete data, duplicate data may be created in a plurality of tables, databases, and systems. Storage of such duplicate data consumes capacity of the database, which results in increasing maintenance cost and requiring a longer time for search.

It is common for the same data to be stored in numerous tables, databases, and systems. For example, if a system includes information for customers that send and receive packages, the system may store customer information such as a customer name, address, identification number, invoice number, and tracking information. However, the same customer information may be stored in more than one table with different column names and column data types. In addition, the same customer information may be stored in more than one database and system. Moreover, there may be missing column names.

One way to locate duplicate data is for company personnel to manually review all data in each table of a database. However, a manual review of numerous tables, databases, and systems could takes days, months, or years. As the number of tables, databases, and systems increase, manual review may become unworkable. In addition, using a computerized search methodology is inefficient. For example, there may be hundreds of thousands of tables that include customer information. These tables may include millions of fields and trillions of rows of data. The time needed to search for duplicate data may take thousands of years using a computer.

Accordingly, there is a need to reduce the time needed to search for duplicate data within tables, databases, and systems. To address these needs, a system is needed that may accurately and efficiently search and locate duplicate data.

SUMMARY

In one exemplary embodiment, there is provided a method for identifying duplicate data. The method may include identifying one or more reference fields that include one or more data values. The method may include retrieving the one or more reference fields and one or more data values. The method may also include transforming the one or more reference fields into one or more reference fingerprint patterns. The method may also include identifying one or more target fields that include one or more target field values. The method may also include retrieving the one or more target fields. The method may also include transforming the one or more target field values into one or more target fingerprint patterns. The method may also include comparing the one or more reference fingerprint patterns with the one or more target fingerprint patterns. The method may further include determining an overlap between the one or more reference fingerprint patterns and the one or more target fingerprint patterns.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

System Architecture

Figure 1:
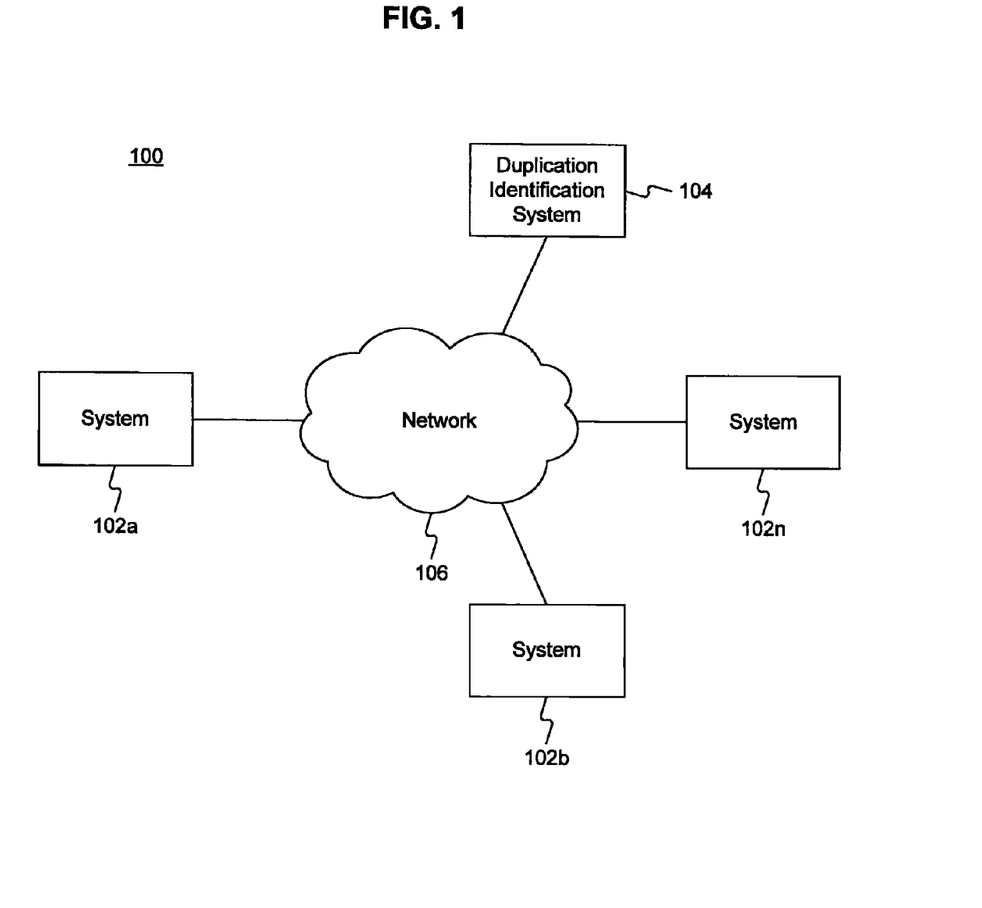
FIG. 1 illustrates an exemplary computing system that can be used to implement embodiments of the invention.

By way of a non-limiting example, FIG. 1 illustrates a system 100 in which the features and principles of the present invention may be implemented. The number of components in system 100 is not limited to what is shown, and other variations in the number of arrangements of components are possible, consistent with embodiments of the invention. The components of FIG. 1 may be implemented through hardware, software, and/or firmware. System 100 may include systems 102a, 10b, and 102n, duplication identification system 104, and network 106.

Network 106 provides communications between or among the various entities depicted in system 100. Network 106 may be a shared, public, or private network and may encompass a wide area or local area. Network 106 may be implemented through any suitable combination of wired and/or wireless communication networks (including Wi-Fi networks, GSM/GPRS networks, TDMA networks, CDMA networks, Bluetooth networks, or any other wireless networks). By way of example, network 106 may be implemented through a wide area network (WAN), local area network (LAN), an intranet, and/or the Internet. Further, the entities of system 100 may be connected to multiple networks 106, such as, for example, to a wireless carrier network, a private data network, and the public Internet.

Systems 102a-102n may include one or more processors, such as computers. Systems 102a-102n may each contain one or more databases that store one or more tables of data. The data may include, for example, customer information including a customer name, address, identification number, invoice number, and tracking information for a shipment.

Duplication identification system 104 may provide a platform for communicating with systems 102a-102n. Duplication identification system 104 may be implemented using a combination of hardware, software, and/or firmware, and may be operable to receive and store data from various systems 102a-102n. For example, duplication identification system 104 may search for and receive data from systems 102a-102n regarding customer information.

Figure 2:
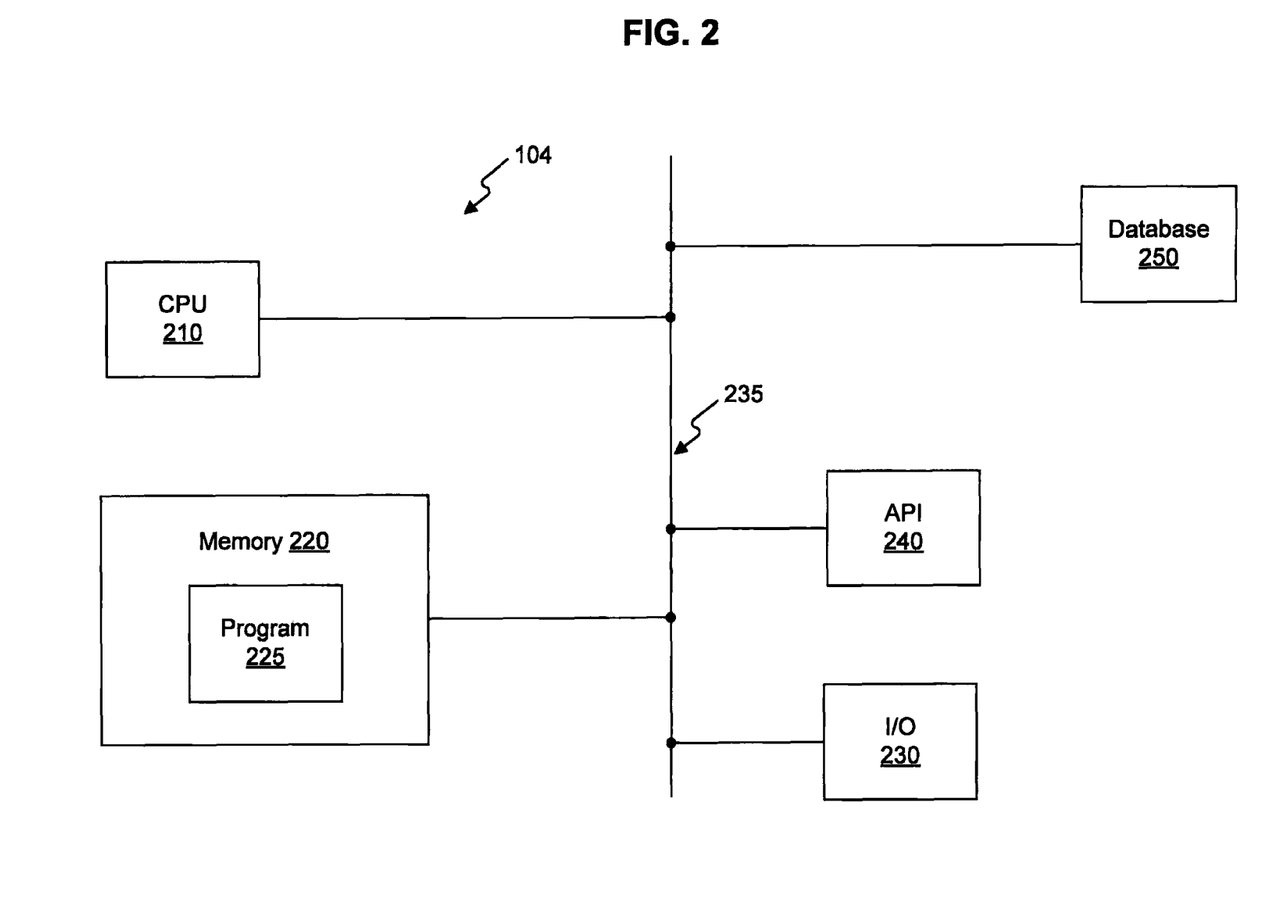
FIG. 2 illustrates an exemplary computing terminal that can be used to implement embodiments of the invention.

FIG. 2 illustrates an exemplary duplication identification system 104 that may be used to implement embodiments of the invention. The components and arrangement, however, are not critical to the invention. One of ordinary skill will recognize that embodiments of the invention may be implemented by computers or workstations organized as shown, organized in a distributed processing system architecture, or organized in myriad suitable combinations of software, hardware, and/or firmware.

For example, duplication identification system 104 may include components such as a central processing unit (CPU) 210, a memory 220, an input/output (I/O) device(s) 230, an application programming interface (API) 240, and a database 250 that can be implemented in various ways. For example, an integrated platform (such as a workstation, personal computer, laptop, etc.) may comprise CPU 210, memory 220, I/O devices 230, API 240, and database 250, interconnected by a local bus 235. In such a configuration, components 210, 220, 230, 240, and 250 may connect through a local bus interface.

CPU 210 may be one or more known processing devices, such as a microprocessor from the Pentium family manufactured by Intel™ or a mainframe-class processor. Memory 220 may be one or more storage devices configured to store information used by CPU 210 to perform certain functions, operations, and steps related to embodiments of the present invention. Memory 220 may be a magnetic, semiconductor, tape, optical, or other type of storage device. In one embodiment, memory 220 includes one or more software application programs 225 that, when executed by CPU 210, perform various processes consistent with the present invention.

Methods, systems, and articles of manufacture consistent with the present invention are not limited to programs configured to perform dedicated tasks. For example, memory 220 may be configured with a program 225 that performs several functions consistent with the invention when executed by CPU 210. Alternatively, CPU 210 may execute one or more programs located remotely from duplication identification system 104. For example, duplication identification system 104 may access one or more remote programs that, when executed, perform functions related to embodiments of the present invention. The configuration and number of programs implementing processes consistent with the invention are not critical to the invention.

Memory 220 may be also be configured with an operating system (not shown) that performs several functions well known in the art when executed by CPU 210. By way of example, the operating system may be Microsoft Windows™, Unix™, Linux™, an Apple™ operating system such as MAC OSX™, Personal Digital Assistant operating system such as Microsoft CE™, or other operating system. The choice of operating system, and even the use of an operating system, is not critical to the invention.

I/O device(s) 230 may comprise one or more input/output devices that allow data to be received and/or transmitted by duplication identification system 104. For example, I/O device 230 may include one or more input devices, such as a network connection, keyboard, touch screen, mouse, microphone, disk reader, and the like, that enable data to be input or received from a user. Further, I/O device 230 may include one or more output devices, such as a network connection, display screen, printer, speaker devices, and the like, that enable data to be output or presented to a user. The configuration and number of input and/or output devices incorporated in I/O device 230 are not critical to the invention.

API 240 is an interface used by duplication identification system 104 to execute user requests. API 240 may be used in conjunction with I/O device 230 to define, for example, monitoring parameters, events, and notifications with respects to shipments. In addition, API 240 may query and receive information regarding shipments in response to information received at I/O device 230.

Database 250 may comprise one or more databases that store information and are accessed and managed through system 100. By way of example, database 250 may be an Oracle™ database, a Sybase™ database, or other relational database. Furthermore, the data could be stored in a computer file with a fixed field or delimited field formatting and may or may not be indexed. In addition, all of the data may be stored in memory 220.

Figure 3:
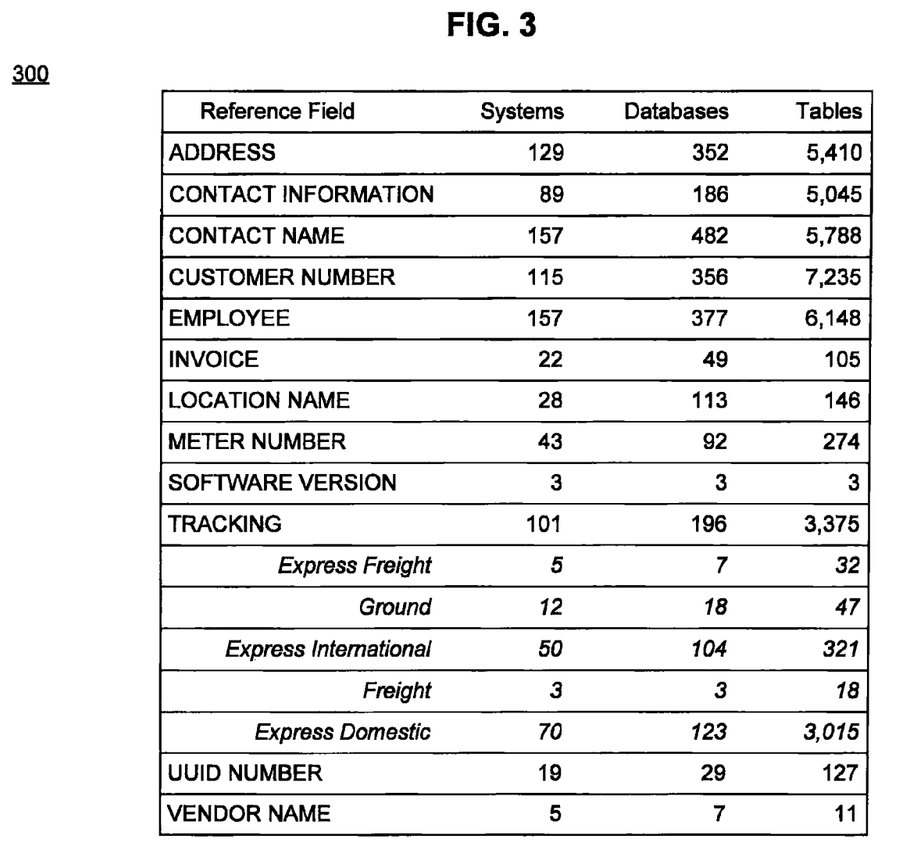
FIG. 3 illustrates an exemplary grid of reference field names, systems, databases, and tables consistent with an embodiment of the present invention.

FIG. 3 illustrates an exemplary grid 300 of reference field data, systems, databases, and tables. As illustrated in FIG. 3, numerous reference field data may exist throughout a plurality of systems, databases, and tables. For example, the reference field name ADDRESS may exist in 5,410 tables, 352 databases, and 129 systems. Likewise, numerous additional reference fields, such as CONTACT INFORMATION, CONTACT NAME, CUSTOMER NUMBER, EMPLOYEE, and TRACKING may be located in hundreds or thousands of different tables, databases, and systems.

Figure 4:
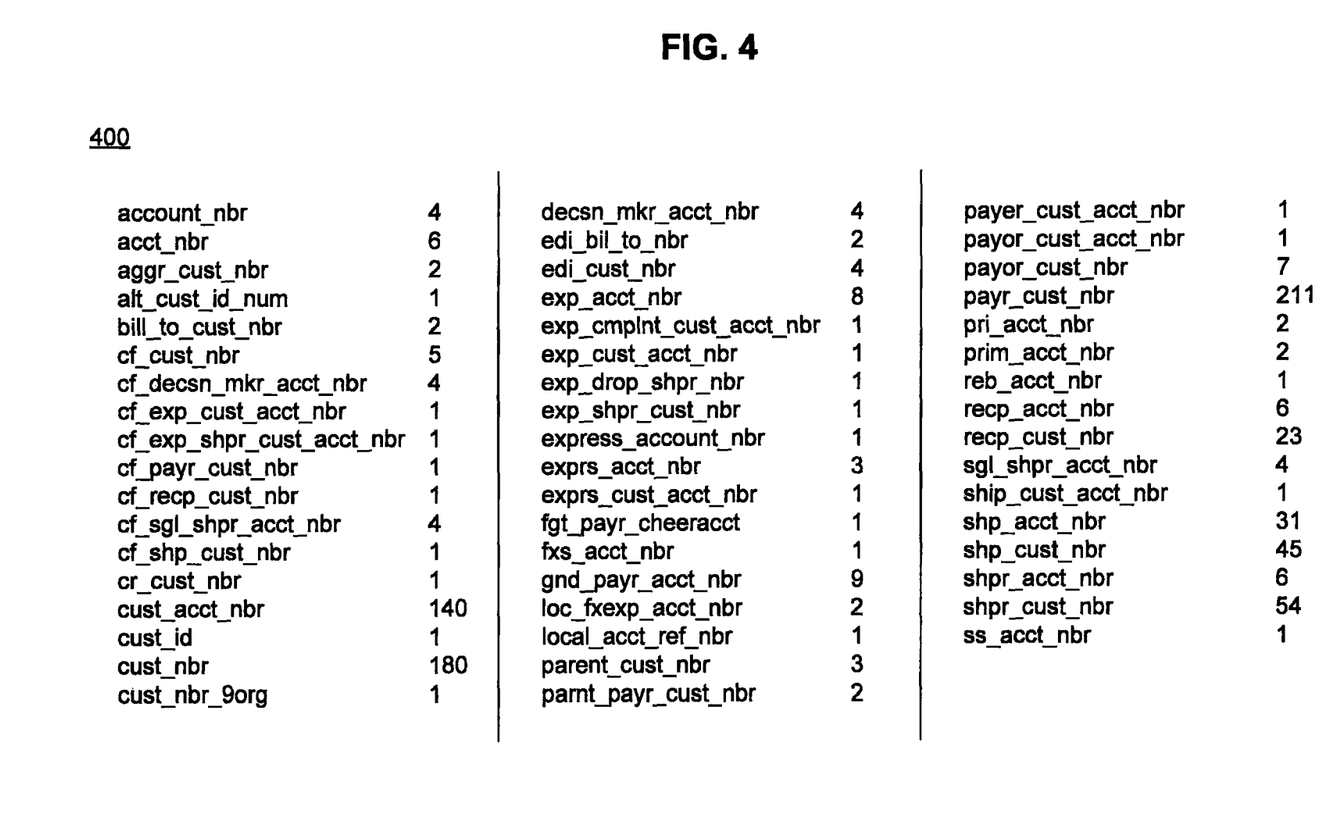
FIG. 4 illustrates an exemplary list of different target field names corresponding to a customer number consistent with an embodiment of the present invention.

FIG. 4 illustrates an exemplary list 400 of different target field names corresponding to a reference field for customer number and the number of occurrences of each target field name. As illustrated in FIG. 4, the target fields corresponding to reference field customer number may be called, for example, account_nbr, acct_nbr, aggr_cust_nbr, etc. In addition, target field name account_nbr may occur four times, target field name acct_nbr may occur six times, and target field name aggr_cust_nbr may occur twice within the same system.

In order to efficiently search for duplicate data with 100% accuracy (i.e. no matching fields are incorrectly categorized as non-matching, and no non-matching field are incorrectly categorized as matching), a comparison of the contents of all target fields must be compared to each other. However, a manual inspection of the data of each target field is inefficient. Moreover, electronically reviewing and determining duplicate address information may take years to complete.

Heuristics may be used to reduce the search space while still finding all matches. For example, the size of the search space may be reduced by applying knowledge information regarding the data stored in the tables, databases, and systems. For example, each of the databases in the systems may be familiar with the data and may know which fields are most likely to be duplicated and which fields may indicate the existence of the duplicate data.

Referring back to FIG. 3, reference fields names CONTACT INFORMATION, CONTACT NAME, CUSTOMER NUMBER, EMPLOYEE, and TRACKING exist in thousands of different tables. Accordingly, there is a probability that these fields include duplicate data. Therefore, instead of comparing the contents of each field with every other field, duplication identification system 104 may instead compare fields having a minimum length of characters to a set of known targets. This method of comparison may result in a magnitude reduction of field combinations by several orders of magnitude.

Duplication identification system 104 may extract all reference field values and transform them into reference fingerprint patterns. Duplication identification system 104 may then compare the reference fingerprint patterns to target fingerprint patterns generated from samples of the target data fields to reduce the number of required comparisons. If a reference fingerprint pattern matches a target fingerprint pattern, an actual match may exist. If a reference fingerprint pattern does not match a target fingerprint pattern, the actual values of the fingerprint pattern do not match.

Figure 5:
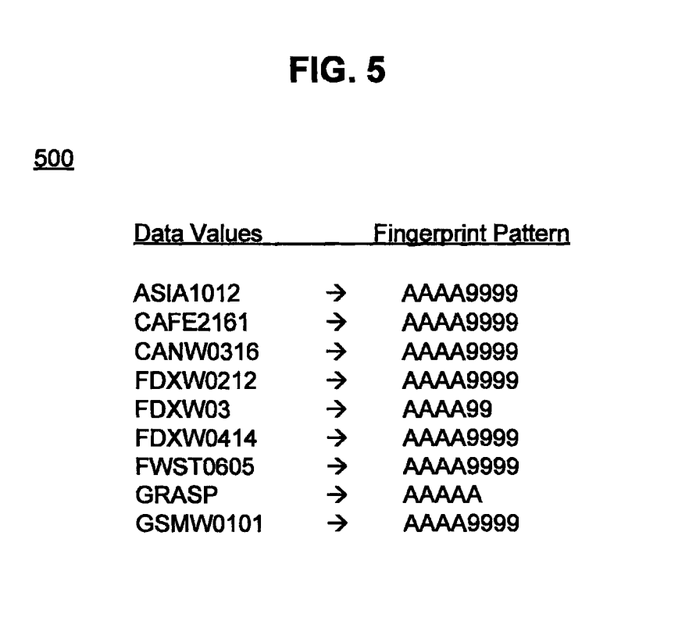
FIG. 5 illustrates exemplary fingerprint patterns consistent with an embodiment of the present invention.

FIG. 5 illustrates exemplary fingerprint patterns. As illustrated in FIG. 5, chart 500 depicts the transformation of data values into fingerprint patterns. The data values may correspond to the information contained within the reference and target fields located in one or more tables, databases, and systems, as illustrated in FIGS. 3 and 4.

The transformation of data values into a fingerprint pattern may occur based on several rules. All letters (e.g. "A" to "Z") may be transformed into the letter "A." In addition, all numbers (e.g. "0" to "9") may be transformed into the number "9." All other possible characters may be transformed according to additional rules (e.g. spaces and special characters may be transformed into "#"), or they may not be transformed and may be left unchanged. One of ordinary skill in the art would appreciate that any number of fingerprint transformation rules may exist, and each rule may include any combination of one or more transformations.

As illustrated in FIG. 5, data value "ASIA1012" may be transformed into a fingerprint pattern of "AAAA9999." Based on this transformation, the number of characters may remain the same (e.g. eight characters), but the letters are changed to "A," and the numbers are changed to "9." Likewise, data value "CAFE2162" may also be transformed into a fingerprint pattern of "AAAA9999." This example of a fingerprint pattern includes the letter "A" four times and the number "9" four times.

Data values containing different combinations of letters and numbers may also be transformed. For example, data value "FDXW03" may be transformed into a second fingerprint pattern of "AAAA99." Similarly, data value "GRASP" may be transformed into a third fingerprint pattern of "AAAAA." As illustrated in FIG. 5, three fingerprint patterns may exist. However, one of ordinary skill would appreciate that any number of fingerprint patterns may exist, and each pattern may include any combination of one or more letter and numbers. In addition, any number of fingerprint patterns may exist that include only letters or only numbers. Moreover, fingerprint patterns may also exist that include more than one type of letter (e.g. "A" and "B"), more than one type of number (e.g. "1" and "2"), and one or more special characters (e.g. "#").

After transformation of the data values into fingerprint patterns, duplication identification system 104 may perform a search for all pattern matches. If one or more pattern matches are found, duplication identification system 104 may compare the actual data values represented by each pattern to determine if duplicate data exists. Conversely, the absence of pattern matches may indicate that the detailed data will not match and duplicate data does not exist.

As stated above, not all data may be searched to identify possible data value duplication. Using heuristics to reduce the search space, the size of the search space may be reduced by applying knowledge information regarding the data stored in the tables, databases, and systems. Because each of the databases in the systems may be familiar with the data, the databases may know which fields are most likely to be duplicated and which fields may indicate the existence of the duplicate data.

Flowchart

Figure 6:
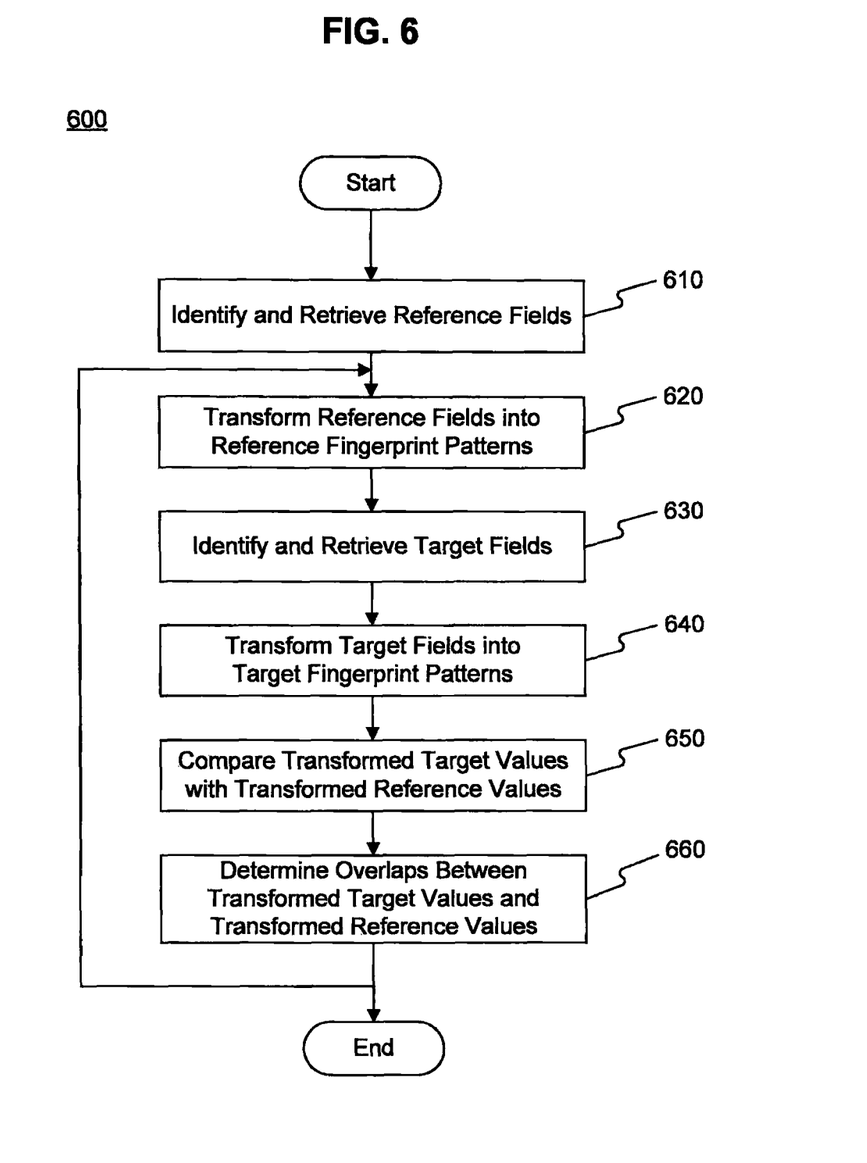
FIG. 6 illustrates a flowchart of an exemplary method for identifying duplicate data consistent with an embodiment of the present invention.

FIG. 6 illustrates a flowchart 600 of an exemplary method for identifying duplicate data, consistent with the principles of the present invention. Although the steps of the flowchart are described in a particular order, one skilled in the art will appreciate that these steps may be performed in a modified or different order, or that certain steps may be omitted or other steps added. Further, one or more of the steps in FIG. 6 may be performed concurrently or in parallel.

Duplication identification system 104 may identify one or more reference fields (step 610). As illustrated in FIG. 3, numerous reference field data may exist throughout a plurality of systems, databases, and tables. After identifying the one or more reference fields, duplication identification system 104 may retrieve the identified one or more reference fields.

After duplication identification system 104 identifies and retrieves the one or more reference fields, duplication identification system 104 may transform the one or more reference fields into one or more reference fingerprint patterns (step 620). The transformation of the one or more reference fields into one or more reference fingerprint patterns may occur based on several rules. All letters (e.g. "A" to "Z") may be transformed into the letter "A." In addition, all numbers (e.g. "0" to "9") may be transformed into the number "9." All other possible characters may be transformed according to additional rules (e.g. spaces and special characters may be transformed into "#"), or they may not be transformed and may be left unchanged. One of ordinary skill in the art would appreciate that any number of fingerprint transformation rules may exist, and each rule may include any combination of one or more transformations.

After transforming the one or more reference fields into one or more reference fingerprint patterns, duplication identification system 104 may identify one or more target fields that include one or more data values (step 630). As illustrated in FIG. 4, target fields corresponding to reference field customer number may be called, for example, account_nbr, acct_nbr, aggr_cust_nbr, etc., and each target field name may occur one or more times.

After identifying the one or more target fields, duplication identification system 104 may retrieve the identified one or more target fields. Duplication identification system 104 may retrieve a sample of target field values and data values, corresponding to each target field, stored in tables and databases of systems 102a-102n. For example, duplication identification system 104 may retrieve 1,000 samples of target field values and their corresponding data values and store these values in memory 220. In addition to retrieving and storing samples of target field values and data values, duplication identification system 104 may also search individual tables, databases, and systems, without storing the samples of data values in memory 220.

After duplication identification system 104 identifies and retrieves the one or more target fields, duplication identification system 104 may transform the one or more target fields into one or more target fingerprint patterns (step 640). In order to prepare the target fields for transformation, duplication identification system 104 may determine that the target fields should include data values containing a desired number of characters and digits. This desired number can be predetermined by duplication identification system 104, or may be selected or input by a user of duplication identification system 104 at, for example, I/O 230. The target fields and corresponding data values may be representative of specific information in a reference field, such as, for example, a customer number, customer address, customer number, tracking number, etc. These target fields are likely to include duplicate data.

The transformation of the one or more target fields into a target fingerprint pattern may occur based on several rules. All letters (e.g. "A" to "Z") may be transformed into the letter "A." In addition, all numbers (e.g. "0" to "9") may be transformed into the number "9." All other possible characters may be transformed according to additional rules (e.g. spaces and special characters may be transformed into "#"), or they may not be transformed and may be left unchanged. One of ordinary skill in the art would appreciate that any number of fingerprint transformation rules may exist, and each rule may include any combination of one or more transformations.

After duplication identification system 104 identifies and retrieves the target field values and data values, duplication identification system 104 may compare the target fingerprint patterns of the target fields with the reference fingerprint patterns of the reference fields (step 650). For example, duplication identification system 104 may compare overlapping fingerprint patterns between the reference field values and the target field values.

As previously stated, duplication identification system 104 may generate reference fingerprint patterns corresponding to the reference fields and target fingerprint patterns corresponding to the target fields. For example, duplication identification system 104 may transform reference field values including at least one letter or number into a pattern of "A"s and "9"s. In addition, duplication identification system 104 may transform target field values including at least one letter into a pattern of "A"s and target field values including at least one number into a pattern of "9"s.

Duplication identification system 104 may search for one or more fingerprint patterns. For example, duplication identification system 104 may search only for fingerprint pattern "999999." Based on this search criteria, duplication identification system 104 may search all transformed reference field values and target field values that match fingerprint pattern "999999." In addition, duplication identification system 104 may also search all transformed reference field values and target field values that match fingerprint patterns "9," "99," "999," "9999," and "99999." However, according to this example, duplication identification system 104 may not search for transformed reference field values and target field values that include more than six digits or transformed data values and data values that include characters other than "9."

One of ordinary skill would appreciate that duplication identification system 104 may search for any number of fingerprint patterns, including, for example, fingerprint patterns that match a number of digits of a search pattern, fingerprint patterns that include a number of digits that are less than or equal to a number of digits of a search pattern, fingerprint patterns that include a number of digits that are greater than or equal to a number of digits of a search pattern, fingerprint patterns that include only numbers or letters, and fingerprint patterns that include both numbers and letters.

According to an exemplary embodiment, duplication identification system 104 may search for all fingerprint patterns that include up to six "9"s. Therefore, all reference and target field values that include "9," "99," "999," "9999," "99999," and "999999" would include potential duplicate data. However, reference and target field values that include more than six "9"s would not be candidates for duplicate data based on this search criteria. In addition, reference and target field values that include one or more "A"s would also not be candidates.

After duplication identification system 104 searches for potential duplicate data among the transformed reference field values and target field values, duplication identification system 104 may determine overlaps between the transformed target field values and reference field values (step 660).

If at least one overlap exists, duplication identification system 104 may score each sampled target field value and data value with the target fingerprint pattern. Duplication identification system 104 may score a sample match, target match, and match probability. To score the sample match, duplication identification system 104 may determine the number of sample data values that match the target field value fingerprint pattern and divide this number by the total number of searched or sampled data values. For example, if duplication identification system 104 searches 4,000 samples of data values that may match target fingerprint pattern "999999," 2,000 samples may match the target field value fingerprint pattern. Therefore, the sample match score would be calculated by dividing 2,000 sample data value matches by the 4,000 searched data value samples. This results in a sample match score of 0.5, or 50%. This score may represent the maximum percentage of sample data values that could match the target fingerprint pattern.

To score the target match, duplication identification system 104 may determine the number of sample target field values that match the target field value fingerprint pattern. For example, if duplication identification system 104 searches 1,000 samples of target field values that may match target fingerprint pattern "999999," 500 samples may match the target field value fingerprint pattern. Therefore, the target match score would be calculated by dividing 500 sample target field value matches by the 1,000 searched target field value samples. This results in a sample target field value score of 0.5, or 50%. This score may represent the maximum percentage of sample target field values that could match the target fingerprint pattern. Using a target match may help avoid the situation where patterns of sampled data values match a rare pattern of the target field.

To score the match probability, duplication identification system 104 may multiply the sample match score and the target match score. According to the above example, the match score may be calculated by multiplying the sample match score of 50% and the sample target field value score of 50%. This results in a match probability of 0.25, or 25%. The match probability may help the ensure a strong match of both target field values and data values.

After comparing the fingerprint patterns of the target field values and data values, duplication identification system 104 may compare detailed data values (step 640). Depending on the match probability, data values contained in the tables and databases may be duplicated. For example, if the match probability is $\geq 0.10$, there is a likelihood of duplicate data. One of ordinary skill would appreciate the numerous different match probabilities may be used and are within the scope of this disclosure.

If a desired match probability exists, the sampled target field values and data values may be joined to determine duplicate data. After joining the data, duplication identification system 104 may score each joined target field value and data value. Scoring may include determining a detailed match percentage and using the detail match to generate a final score.

For example, duplication identification system 104 may determine the number of overlapping, or duplicate, sampled target field values and data values. This number of duplicate values may be referred to as detailed matches. The number of detailed matches may be divided by the number of sample data values that match the target field value fingerprint pattern. For example, if 100 detailed matches exist and 4,000 samples of data values match the target fingerprint pattern (e.g. "999999"), the detailed match percentage may be calculated by dividing 100 by 4,000. This results in a detailed match percentage of 0.025, or 2.5%.

After calculating the detailed match percentage, a final score may be calculated by multiplying the detailed match percentage by the match probability. According to the above example, the detailed match percentage of 2.5% multiplied by the match probability of 25% results in a final score of 0.00625, or 0.625%.

Duplication identification system 104 may have a predetermined final score that indicates the existence of duplicate data. Conversely, the user of duplication identification system 104 may select or input a desired final score. Based on the predetermined or user-defined final score, duplication identification system 104 may determine if a desired amount of duplicate data exists. If the desired amount exists, duplication identification system 104 may present a corresponding indication on I/O 230. In addition, duplication identification system 104 may also generate and present the corresponding duplicate data and an indication of the location of the duplicate data (e.g. the location of the tables, databases, and systems) on I/O 230.

After generating and presenting the duplicate data and an indication of the location of the duplicate data, duplication identification system 104 may identify and retrieve target field values and data values again for different fingerprint patterns.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described as being associated with data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for identifying duplicate data, the method comprising the steps, performed by a computer, of:
   identifying one or more reference fields that include one or more data values; retrieving the reference fields;
   generating one or more reference fingerprint patterns;
   transforming the reference fields into the one or more reference fingerprint patterns;
   identifying one or more target fields that include one or more data values;
   retrieving the target fields; generating one or more target fingerprint patterns;
   transforming the target fields into the one or more target fingerprint patterns;
   comparing the one or more target fingerprint patterns with the one or more reference fingerprint patterns; and
   determining an overlap between the one or more target fingerprint patterns and the one or more reference fingerprint patterns to identify duplicate data, wherein the one or more reference fingerprint patterns and one or more target fingerprint patterns include one or more letters and one or more numbers.

2. The method of claim 1, further comprising:
   storing the retrieved reference fields and target fields.

3. The method of claim 1, further comprising:
   determining at least one of a sample match score, target match, and match probability.

4. The method of claim 3, wherein the match probability is $\geq 0.10$.

5. The method of claim 3, further comprising:
   determining a final score.

6. A computer-readable medium containing instructions which when executed on a processor performs a method for identifying duplicate data, the method comprising:
   identifying one or more reference fields that include one or more data values;
   retrieving the reference fields;
   generating one or more reference fingerprint patterns;
   transforming the reference fields into the one or more reference fingerprint patterns;
   identifying one or more target fields that include one or more data values;
   retrieving the target fields;
   generating one or more target fingerprint patterns;
   transforming the target fields into the one or more target fingerprint patterns;
   comparing the one or more target fingerprint patterns with the one or more reference fingerprint patterns; and
   determining an overlap between the one or more target fingerprint patterns and the one or more reference fingerprint patterns to identify duplicate data, wherein the one or more reference fingerprint patterns and one or more target fingerprint patterns include one or more letters and one or more numbers.

7. The computer-readable medium of claim 6, further comprising:
   storing the retrieved reference fields and target fields.

8. The computer-readable medium of claim 6, further comprising:
   determining at least one of a sample match score, target match, and match probability.

9. The computer-readable medium of claim 8, wherein the match probability is $\geq 0.10$.

10. The computer-readable medium of claim 8, further comprising:
    determining a final score.

11. A system for identifying duplicate data, comprising:
    one or more systems that include one or more target fields and data values; and
    a duplication identification system comprising one or more processors, wherein the duplication identification system:
    identifies one or more reference fields that include one or more data values;
    retrieves the reference fields;

generates one or more reference fingerprint patterns;
transforms the reference fields into the one or more reference fingerprint patterns;
identifies one or more target fields that include one or more data values;
retrieves the target fields;
generates one or more target fingerprint patterns;
transforms the target fields into the one or more target fingerprint patterns;
compares the one or more target fingerprint patterns with the one or more reference fingerprint patterns; and
determines an overlap between the one or more target fingerprint patterns and the one or more reference fingerprint patterns to identify duplicate data, wherein the one or more reference fingerprint patterns and one or more target fingerprint patterns include one or more letters and one or more numbers.

12. The system of claim 11, wherein the duplication identification system stores the retrieved reference fields and target fields.

13. The system of claim 11, wherein the duplication identification system determines at least one of a sample match score, target match, and match probability.

14. The system of claim 13, wherein the match probability is $\geq 0.10$.

15. The system of claim 13, wherein the duplication identification system determines a final score.

* * * * *